S. BURDETT.

Carriage-Step.

No. 7,591. Patented Aug. 27, 1850.

UNITED STATES PATENT OFFICE.

STEPHEN BURDETT, OF NEW YORK, N. Y.

TURNING UP THE STEPS OF OMNIBUSES.

Specification of Letters Patent No. 7,591, dated August 27, 1850.

*To all whom it may concern:*

Be it known that I, STEPHEN BURDETT, of the city, county and State of New York, have invented a new and useful improvement on the steps of omnibuses and other carriages conveying passengers, it turning up the step by the action of a spring, and in combination with a brake for stopping the carriage operated by the driver's foot; and I do hereby declare that the following is a full and exact description.

To enable others skilled in the art to make and use my invention, I will proceed to describe its construction and operation, reference being had to the annexed drawings, making part of this sepcification, and accompanying model, for the better understanding of the same, in which—

Figure 1:
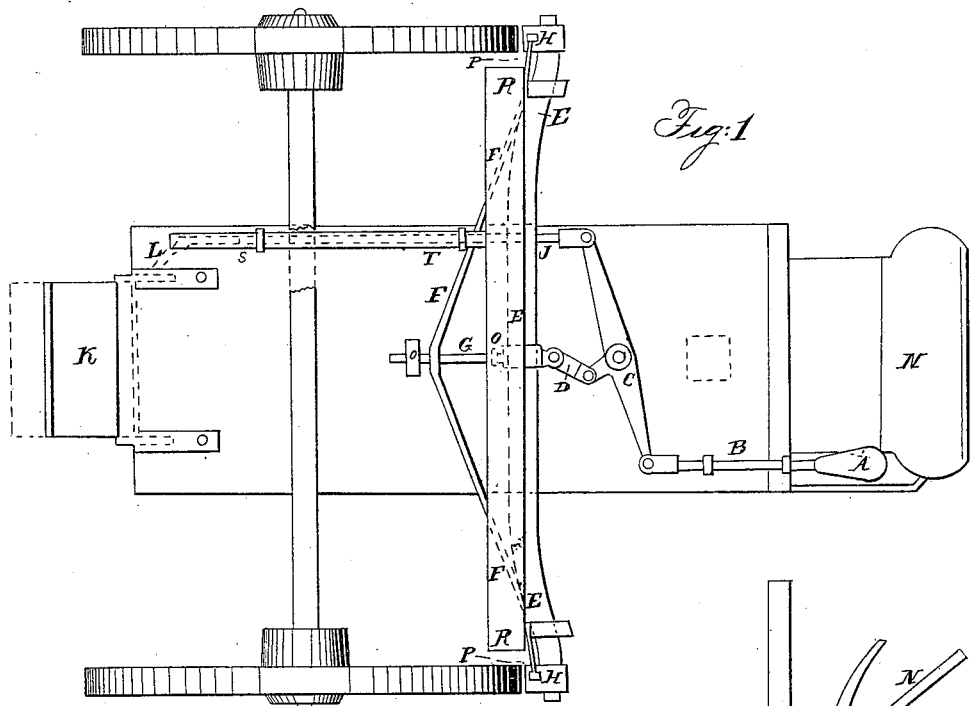
Figure 2:
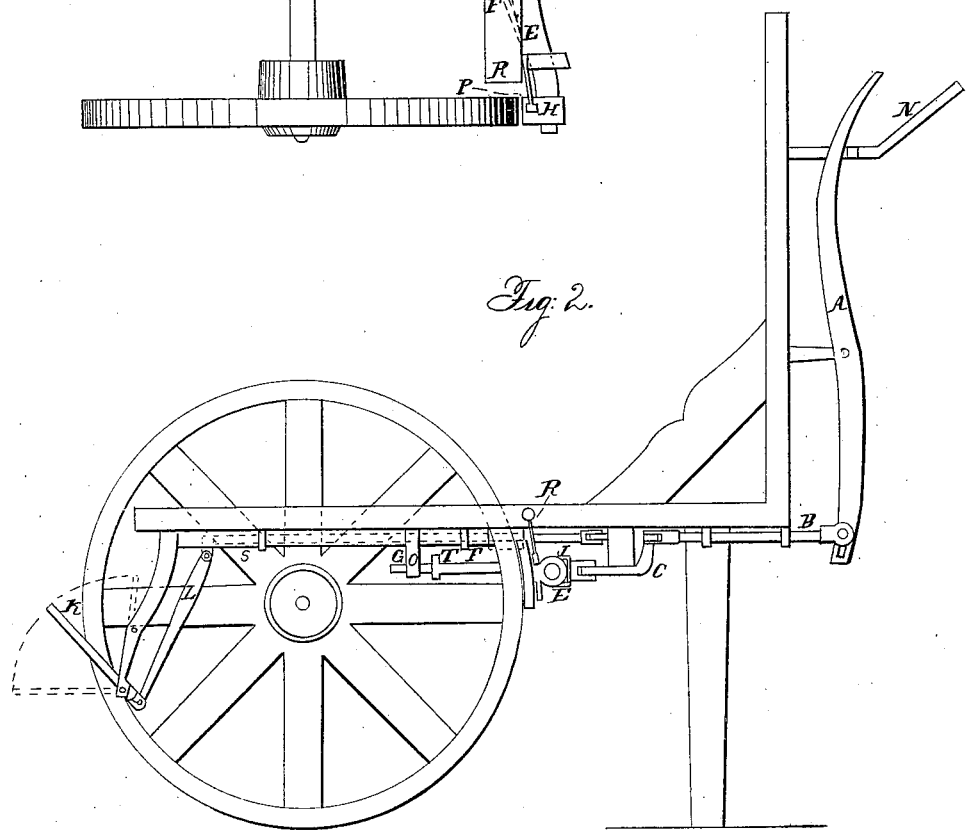

Figure 1 is a plan, and Fig. 2 is a side elevation of the apparatus.

The same letters refer to the same parts in both views.

A, A, front upright lever movable on its joint near the center of its length, and operated by the driver's foot while seated; N, N, being the driver's foot board as usual; B, B, fore coupling rod connecting upright lever with the cross lever C, C, moving on its joint pin fastened to the underside of the bottom of the carriage; D, D, the brake shackle jointed at one end to the short arm of the cross lever C, and at the other end jointed to the brake bar E, E; the brake bar is strengthened by a brace F, F, and is kept in proper position by its guide rod G, G, passing through the guides O, O; the brake bar carries on each end the brake blocks H, H, which are partly sustained by the springs p, p, fastened to the spring bar R, R; J, J, hind coupling rod jointed at one end to the cross lever C, and passing through the spring case T, T, and spring S, S, has a joint on the other end coupled to the step shank L, L, which connect with the short lever Q, Q, fastened to the step K, K, of the carriage and turns it up moving on its joints, as soon as the driver takes his foot off the upper end of the front upright lever, and the passenger leaves the step.

I do not intend to restrict myself to the use of spiral springs, but I prefer this arrangement for convenience.

I do not claim the brake, nor the action of levers connecting it with the foot of the driver; but

What I claim—

Is the turning up of the step (it being properly prepared for the purpose) by the action of the spiral, or other spring upon the stepping off of the passenger, and the withdrawing of the driver's foot, and its connection with the brake apparatus; thus preventing boys or others from riding on it; the whole being attached to the body of the carriage, and operating substantially as fully set forth in the accompanying drawings and model.

New York, 1st June, 1850.

STEPHEN BURDETT.

Witnesses:
DUNCAN TURNER,
JOHN A. BURDETT.